US010802146B2

United States Patent
Dotson (10) Patent No.: US 10,802,146 B2
(45) Date of Patent: Oct. 13, 2020

(54) ENHANCEMENT OF RANGE MEASUREMENT RESOLUTION USING IMAGERY

(71) Applicant: Ryan Dotson, Reno, NV (US)

(72) Inventor: Ryan Dotson, Reno, NV (US)

(*) Notice: Subject to any disclaimer, the term of this patent is extended or adjusted under 35 U.S.C. 154(b) by 265 days.

(21) Appl. No.: 14/953,311

(22) Filed: Nov. 28, 2015

(65) Prior Publication Data

US 2016/0187482 A1    Jun. 30, 2016

Related U.S. Application Data

(63) Continuation of application No. 12/856,461, filed on Aug. 13, 2010, now Pat. No. 9,229,106.

(51) Int. Cl.
*G01S 17/02* (2020.01)
*G01S 17/89* (2020.01)
*G01S 17/86* (2020.01)

(52) U.S. Cl.
CPC .............. *G01S 17/86* (2020.01); *G01S 17/89* (2013.01)

(58) Field of Classification Search
CPC ...... G01S 17/023; G01S 17/89; G01S 13/867; G01S 19/40
See application file for complete search history.

(56) References Cited

U.S. PATENT DOCUMENTS

| | | | |
|---|---|---|---|
| 4,695,959 A * | 9/1987 | Lees | G01C 11/06 356/3 |
| 6,046,763 A | 4/2000 | Roy | |
| 6,151,424 A * | 11/2000 | Hsu | G06K 9/00201 382/294 |
| 7,187,452 B2 * | 3/2007 | Jupp | G01S 7/497 356/3.01 |
| 7,289,667 B2 * | 10/2007 | Nenonen | G06T 5/004 382/169 |
| 7,417,717 B2 | 8/2008 | Pack et al. | |
| 2004/0213463 A1 * | 10/2004 | Morrison | G01B 11/25 382/210 |
| 2008/0297621 A1 * | 12/2008 | Sun | H04N 5/23232 348/224.1 |
| 2009/0119010 A1 | 5/2009 | Moravec | |
| 2009/0323121 A1 | 12/2009 | Valkenburg et al. | |
| 2010/0204974 A1 * | 8/2010 | Israelsen | G01S 17/023 703/17 |

OTHER PUBLICATIONS

Bretar et al, Managing Full Waveform Lidar Data: A Challenging Task for the Forthcoming Years, International Archives of the Photogrammetry, Remote Sensing and Spatial Information, vol. 37, Part B1, 2003.

(Continued)

*Primary Examiner* — Sujoy K Kundu
*Assistant Examiner* — L. Anderson
(74) *Attorney, Agent, or Firm* — Kerr IP Group, LLC (57) ABSTRACT

This invention provides a method for computing hybrid range measurements wherein range measurements of a target are obtained along with at least two images of the target and the location and the orientation of the images. Hybrid range measurements are computed based on the range measurements and the images.

20 Claims, 5 Drawing Sheets

(56) References Cited

OTHER PUBLICATIONS

D. Scharstein and R. Szeliski, A Taxonomy and Evaluation of Dense Two-Frame Stereo Correspondence Algorithms, International Journal of Computer Vision, 47(1/2/3): 7-42, Apr.-Jun. 2002.
Kanade and Okutomi, A Stereo Matching Algorithm with an Adaptive Window: Theory and Experiment, Proceedings of the 1991 IEEE International Conference on Robotics and Automation, Sacramento, California, Apr. 1991.
D. Lowe, Distinctive Image Features from Scale-Invariant Keypoints, International Journal of Computer Vision, International Journal of Computer Vision, 60, 2 (2004) at 91-110.
H. Bay et al, Surf: Speeded Up Robust Features, Computer Vision and Image Understanding, vol. 110, No. 3 (2008) at 346-59.
J. Sun et al, Stereo Matching using Belief Propagation, IEEE Trans. Pattern Analysis and Machine Intelligence, vol. 25, No. 7 (2003) at 787-800.
S. Becker and N. Haala, Refinement of Building Fassades by Integrated Processing of LIDAR and Image Data, International Archives of Photogrammetry, Remote Sensing and Spatial Information Sciences, vol. 36, Part 3/W49A (2007) at 7-12.
Mastin et al., Automatic Registration of Lidar and Optical Images of Urban Scenes, IEEE Computer Society Conference on Computer Vision and Pattern Recognition, Jun. 20-25, 2009 at 2639-46.
Fei et al., Automatic Registration between Lidar and Digital Images, International Archives of Photogrammetry, Remote Sensing and Spatial Information Sciences, vol. 37, Part BI (2008) at 487-90.
Felzenszwalb and Huttenlocher, Efficient Belief Propagation for Early Vision, International Journal of Computer Vision, vol. 70, No. 1 (Oct. 2006).

\* cited by examiner

ENHANCEMENT OF RANGE MEASUREMENT RESOLUTION USING IMAGERY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND OF THE INVENTION

1. Field of the Invention

This invention generally relates to the fields of remote measurement and three dimensional modeling and, specifically, to improving the spatial resolution of digital elevation models and range measurement datasets.

2. Description of Related Art

Light Detection and Ranging ("LIDAR") systems are capable of accurately measuring a grid of distances from a sensor to a target object or surface. After processing the raw measurements, accurate three-dimensional models of the target can be produced. LIDAR sensors and LIDAR-derived datasets are widely used in Geographic Information Systems (GIS) for a variety of tasks such as flood plain analysis, city skyline analysis, aerial image ortho-rectification and urban modeling. The level of detail present in such datasets is limited by sensor capabilities, with a typical tradeoff between the number of individual measurements and the physical size and extent of the target. In particular, the spatial resolution of airborne LIDAR sensors is limited by the rate at which individual range measurements can be made.

Figure 1:
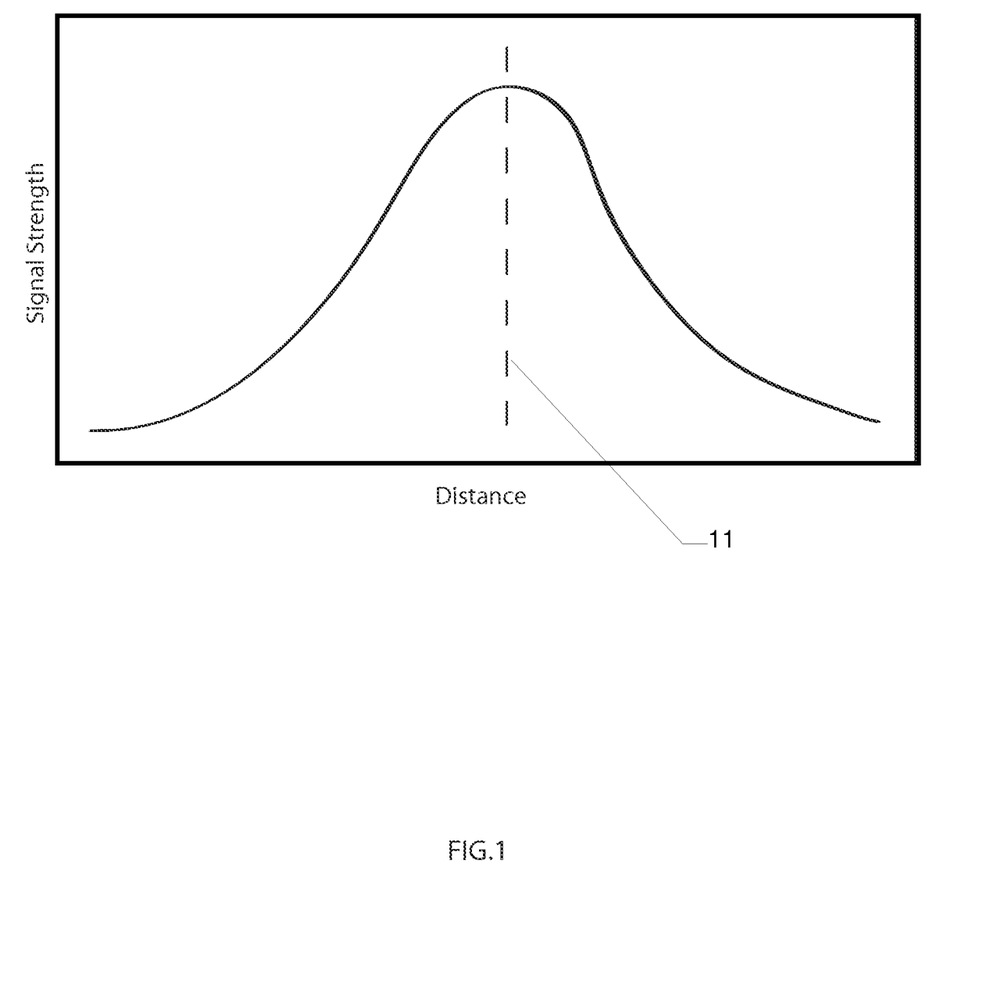
FIG. 1 shows a sample full waveform measurement having a single peak.
Figure 2:
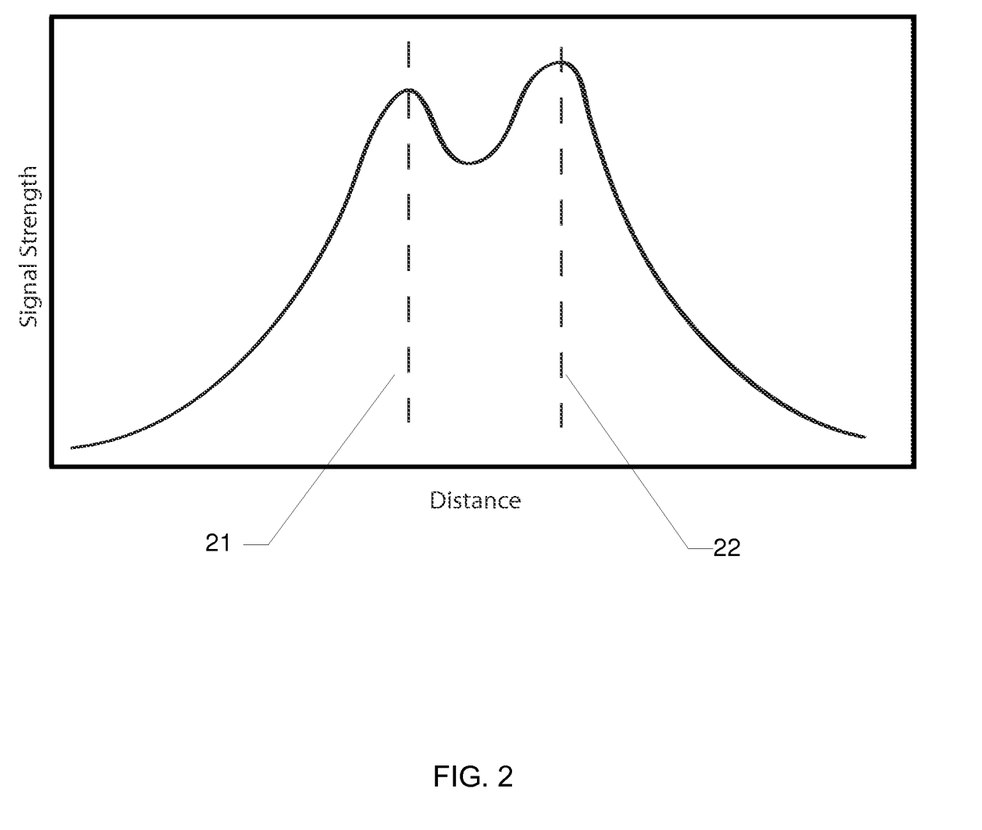
FIG. 2 shows a second sample full waveform measurement with two peaks.

A single measurement from a LIDAR sensor does not typically correspond to a single infinitesimal point on the target. Due to laser beam divergence, a single measurement corresponds to a region on the target whose size depends in part upon the distance between the sensor and the target. Full waveform LIDAR sensors are capable of recording a signal that represents the distribution of distances measured from the sensor to the region. FIGS. 1 and 2 depict two sample measurements. Typically, the most prevalent distance, the statistical mode 11, measured for a region is determined to be the single representative distance for a given measurement. More advanced statistical analysis of the measurement distribution can also yield information about surface variability. For example, in FIG. 2, the second sample measurement, the dual peaks of the waveform 21, 22 are indicative of two significantly different distances within the single measurement. Such a measurement could be encountered when the measurement region overlaps two distinct surfaces, such as a building roof and the ground below. Decomposing such waveforms correctly is a difficult task which cannot be accomplished by means of the measurement hardware alone (Bretar et al, *Managing Full Waveform Lidar Data: A Challenging Task for the Forthcoming Years*, International Archives of the Photogrammetry, Remote Sensing and Spatial Information, Vol. 37, Part B1, 2003).

The prior art shows several examples of attempts to improve the ability of LIDAR sensors to obtain detailed three-dimensional information about the surface of a target. For example, U.S. Pat. No. 7,417,717 to Pack et al. discloses a combination LIDAR and electro-optic detector system. In Pack, the electo-optic image is used to match multiple LIDAR shots of a particular target relative to one another so that the overall three-dimensional accuracy of any single LIDAR data set may be improved. Although such a system may result in improvement of the three-dimensional accuracy of a single LIDAR data set, it is still limited by LIDAR sensor capabilities. Moreover, such a system requires multiple measurements of the range (multiple LIDAR passes) from different locations to the target. Such requirements may prove limiting. For example, when mapping large terrestrial areas from the air, safety and regulatory restrictions may prevent secondary passes at a nearer distance to the ground.

U.S. Patent Application No. 2009/0323121 to Valkenburg et al., discloses a hand-held scanner that combines a range sensor, which may be a LIDAR device, a position and orientation sensor and a texture sensor. Although Valkenburg indicates that the data from these devices may be used to create a realistic three-dimensional representation of a scene, Valkenburg does not address how non-LIDAR "texture" data may be used to improve the resolution of the ranging device. Moreover, Valkenburg is directed toward short range applications and not at gathering information about remote targets.

U.S. Patent Application No. 2009/0119010 to Moravec, discloses a navigation and mapping system that combines the use of stereo cameras with long range sensors such as LIDAR. This system is primarily directed toward navigation, however, and it does not address the problem of improving the resolution of the long range sensor system.

It is well known that three-dimensional range information about a target may be derived from the stereographic processing of two or more images of a scene. Due to the passive nature of the measurement, several difficulties exist with this approach. These difficulties include: (1) the correspondence problem, as it is difficult to unambiguously identify the same feature in multiple images due to the presence of noise and differences in perspective and illumination (D. Scharstein and R. Szeliski, *A Taxonomy and Evaluation of Dense Two-Frame Stereo Correspondence Algorithms*, International Journal of Computer Vision, 47(1/2/3): 7-42, April-June 2002); (2) the aperture problem, which results in textureless or repetitive regions of an image pair being difficult to match (Kanade and Okutomi, *A Stereo Matching Algorithm with an Adaptive Window: Theory and Experiment*, Proceedings of the 1991 IEEE International Conference on Robotics and Automation, Sacramento, Calif., April 1991); and (3) geometric consistency problems such as surface discontinuities and occlusions (Scharstein and Szeliski, 2002).

A variety of approaches exist in the fields of photogrammetry and computer vision to mitigate these problems (Scharstein and Szeliski, 2002). Correspondence problems can be minimized by using advanced feature matching techniques such as SIFT (D. Lowe, *Distinctive Image Features from Scale-Invariant Keypoints*, International Journal of Computer Vision, International Journal of Computer Vision, 60, 2 (2004) at 91-110) or SURF (H. Bay et al, *SURF: Speeded Up Robust Features*, Computer Vision and Image Understanding, Vol. 110, No. 3 (2008) at 346-59). Windowing and geometric consistency problems can be mitigated by the use of global optimization methods, such as those set forth in U.S. Pat. No. 6,046,763 to Roy and J. Sun et al, *Stereo Matching using Belief Propagation*, IEEE Trans. Pattern Analysis and Machine Intelligence, Vol. 25, No. 7 (2003) at 787-800.

Although technically possible, it is typically impractical to obtain a level of distance accuracy equivalent to LIDAR from a stereo imaging system. For a given distance to the target, geometric constraints on the stereo baseline as well as limitations on image resolution render unfeasible long distance, high-accuracy distance measurements using stereo imaging. Additionally, the aforementioned challenges can result in blunders in range data derived purely from stereo images. Such problems limit the measurement capabilities of stereo imaging systems.

There is no consideration in the prior art of an approach that simultaneously combines Full Waveform LIDAR measurements with stereo extraction to produce hybrid measurements. Such an approach has several advantages due to the complementary nature of accuracy and measurement density of LIDAR and stereographic range measurements. Full waveform LIDAR sensors can measure ranges to centimeter-level accuracy from distances of up to thousands of meters. Conversely, imaging systems with very high spatial resolutions are commercially available. By carefully processing the two datasets together, the combination of direct range measurements with stereo extraction would enable an increase in measurement density without a loss in ranging accuracy. An additional advantage of such a hybrid dataset would be that the imagery and the range data are inherently consistent. This is important when rendering the imagery upon the three-dimensional surface, for example, since abrupt changes in the depth dimension will tend to correspond with object borders in the imagery, even though the original range measurements would not have permitted such fine resolution. Thus, three-dimensional visualization and renderings of the highest quality can be produced. Lastly, the hybrid nature of the dataset means that with careful selection of the type of imagery (visible, infrared, etc) used by the method, it is possible to fill voids or gaps in the LIDAR measurements, such as those caused by dense clouds or non-reflective surfaces.

Finally, the prior art that has taught the use stereo imagery to improve range data has focused on feature-based improvement rather than global optimization. One example is S. Becker and N. Haala, *Refinement of Building Fassades By Integrated Processing of LIDAR and Image Data*, International Archives of Photogrammetry, Remote Sensing and Spatial Information Sciences, Vol. 36, Part 3/W49A (2007) at 7-12. This reference concerns the geometric modeling of building facades. Although the modeling method utilizes image data to improve a LIDAR data set, it focuses on recognizable structures, such as edges of windows and doors to accomplish this improvement. Because range data may be taken of any target, not just targets having recognizable structures, a method achieving global optimization of the range data, rather than a feature-based improvement is preferred.

As shown by the prior art, none of the prior approaches have improved the long range measurement capability of range sensors such as LIDAR and IFSAR by combining their measurements with those produced by stereo imaging in a manner that fundamentally improves the resolution and density of the range measurements. The potential advantages of such an approach would address a long felt but unmet need in the field of remote measurement.

SUMMARY OF THE INVENTION

This invention provides a method for computing hybrid range measurements wherein range measurements of a target are obtained along with at least two images of the target and the location and the orientation of the images. Hybrid range measurements are computed based on the range measurements and the images. In various alternative embodiments, the images may be obtained using different technologies such as a global positioning system, an inertial navigation system or a combination of these systems. The range data may be obtained from a LIDAR system, an IFSAR system or a full waveform digitization LIDAR system. The images may be recorded at substantially the same time as the range measurements. In one embodiment, the images have a greater spatial resolution than the range measurements and in a refinement of this embodiment, the computing step includes incorporating the greater spatial resolution of the images into the range measurements. In a different refinement, the range measurements are compounded in the spatial domain and, in a further refining embodiment, the computing step includes considering the images with greater spatial resolution simultaneously with the range measurements compounded in the spatial domain so that the range measurements may be spatially separated.

In two alternative embodiments, the calculating step may utilize the equation $F(L)=F_d+k_hF_h$ or may utilize the equation $F(L)=F_d+k_sF_s+k_hF_h$. In such embodiments, where applicable, $F_d$ represents the imagery data, $F_s$ represents the local surface consistency, and $F_h$ represents the agreement with said range data, while $k_s$ and $k_h$ are weighting coefficients which control the relative contribution of information to the resulting output. In further refinements of these embodiments, the various variables in these equations may be defined as follows:

$$F_d = \sum_{B \in \mathcal{B}} \left[ \frac{1}{|U_B|} \sum_{i,j \in U_B} c(Proj_i(B_x, B_y, E_B), Proj_j(B_x, B_y, E_B)) \right];$$

$$F_s = \sum_{B \in \mathcal{B}} \left[ \sum_{J \in N(B)} s(E_B, E_J) \right]; F_h = \sum_{A \in \mathcal{A}} h(H_A, Z_A).$$

Finally, the calculating step may include the construction of a Markov Random Field.

This invention also contemplates a method of improving the resolution of range data wherein a first set of range data that includes a plurality of ranges within a measurement region is obtained along with two or more images and the position and orientation of the images relative to the range data. A second set of range data with a globally improved spatial resolution is calculated. Alternative embodiments of and refinements to this formulation are similar to those previously described.

These and other features and advantages of this invention are described in, or are apparent from, the following detailed description of various exemplary embodiments of the methods according to this invention.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF THE INVENTION

The present invention teaches a method for improving the resolution of data obtained from LIDAR and similar means for remotely measuring distances, such as Interferometric Synthetic Aperture Radar ("IFSAR") systems. Such sensors can acquire range information in the form of distance distributions which are spatially convolved. That is, the actual measurements consist of distributions of range measurements returned from the target which cannot be separated or organized spatially. Distance information obtained from stereo image processing and combined with the measured distributions is used to de-convolve the distribution of individual distance measurements into multiple spatially coherent and accurate individual measurements. The resulting dataset retains the high accuracy characteristics of the original LIDAR measurements, but has a higher spatial resolution corresponding to that of the imagery used.

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In this description, the terms "range data" and "range measurements" mean collections of data relating to the distances between a target and a reference location. The measurements may be referenced to a local coordinate system, such as a sensor's location at the time of measurement. Alternatively, the range measurements may be considered in a world-based coordinate system or projection, as is commonly the case with aerial LIDAR datasets acquired over large geographic areas. In such a case, the range measurements correspond more directly to elevations above a reference ellipsoid or datum.

The term "target" means an object or surface to be measured. Such an object could be, but is not limited to, a building facade, or the surface of the earth.

The term "images" is to be broadly construed, and includes color or grayscale, infrared or multispectral imagery acquired by a suitable devices such as, but not limited to, digital camera(s), video camera(s) and the like.

By "LIDAR system" is meant any type of Light Detection and Ranging system, such systems utilizing an emitted laser pulse that interacts with an object or feature leading to a temporal distortion of the returned energy profile that may be measured.

By "full waveform LIDAR system" is meant a subset of Light Detection and Ranging systems in which the complete waveform of each backscattered pulse is measured.

By "IFSAR system" is meant any type of Interferometric Synthetic Aperture Radar system.

Figure 4:
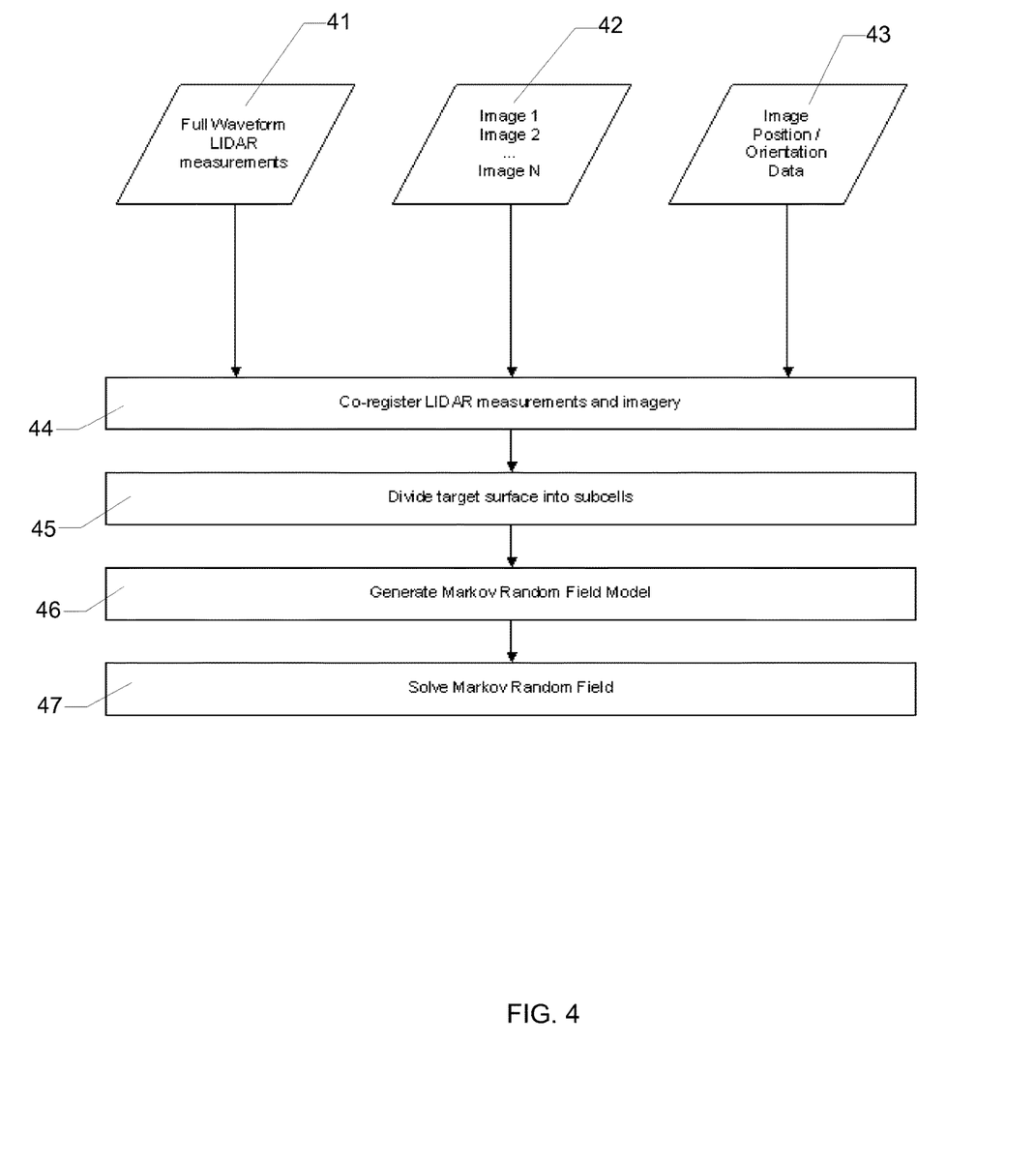
FIG. 4 depicts a schematic representation of the method of an embodiment of the invention.

The present invention is used to combine full waveform LIDAR measurements with two or more images to produce a hybrid dataset which exhibits desired characteristics of each. FIG. 4 shows a schematic representation of the method of one embodiment of the invention, in which LIDAR range measurements 41 are combined with two or more images 42 of the same region, for which the location and orientation parameters 43 of the images are known. It is desirable for the imagery to have a spatial resolution higher than the spatial extent of a single LIDAR measurement region. The images may be acquired by a single camera at different times or by multiple cameras at the same or different times. The image position and orientation parameters may be directly measured at the time they are acquired (using a GPS or INS system), or they may be determined after acquisition using common photogrammetric techniques such as feature matching and bundle adjustment. To successfully merge measurement information from the LIDAR measurements with that contained within the imagery, it is necessary for the two datasets to be aligned to a high degree of accuracy 44. A variety of approaches to accomplish this are well known (see Mastin et al., *Automatic Registration of LIDAR and Optical Images of Urban Scenes*, IEEE Computer Society Conference on Computer Vision and Pattern Recognition, Jun. 20-25, 2009 at 2639-46; Fei et al., *Automatic Registration between LIDAR and Digital Images*, International Archives of Photogrammetry, Remote Sensing and Spatial Information Sciences, Vol. 37, Part B1 (2008) at 487-90).

The result of these processes is that the image parameters and LIDAR measurements are transformed into a common coordinate system. Thus, it becomes possible to relate each LIDAR measurement region to its corresponding locations within the images which contain it. Ultimately, it is the objective of one embodiment, to achieve global improvement of the range data wherein each individual range measurement incorporates information derived from the imagery. In an additional embodiment, the resulting hybrid dataset contains more range measurements (higher spatial density) than the raw LIDAR measurements alone.

Referring to FIG. 4, a grid is specified upon the target surface or object 45 and the imagery and full waveform LIDAR data are then used to construct a Markov Random Field (MRF) 46. Although it is not generally computationally feasible to compute the optimal solution to the MRF directly, an iterative belief propagation method is used to approximate the solution to acceptable accuracy 47. The maximum a posteriori estimate of the variables modeled in the MRF represents a set of hybrid range measurements having the accuracy of the LIDAR measurements, and the higher spatial resolution of the images.

Figure 5:
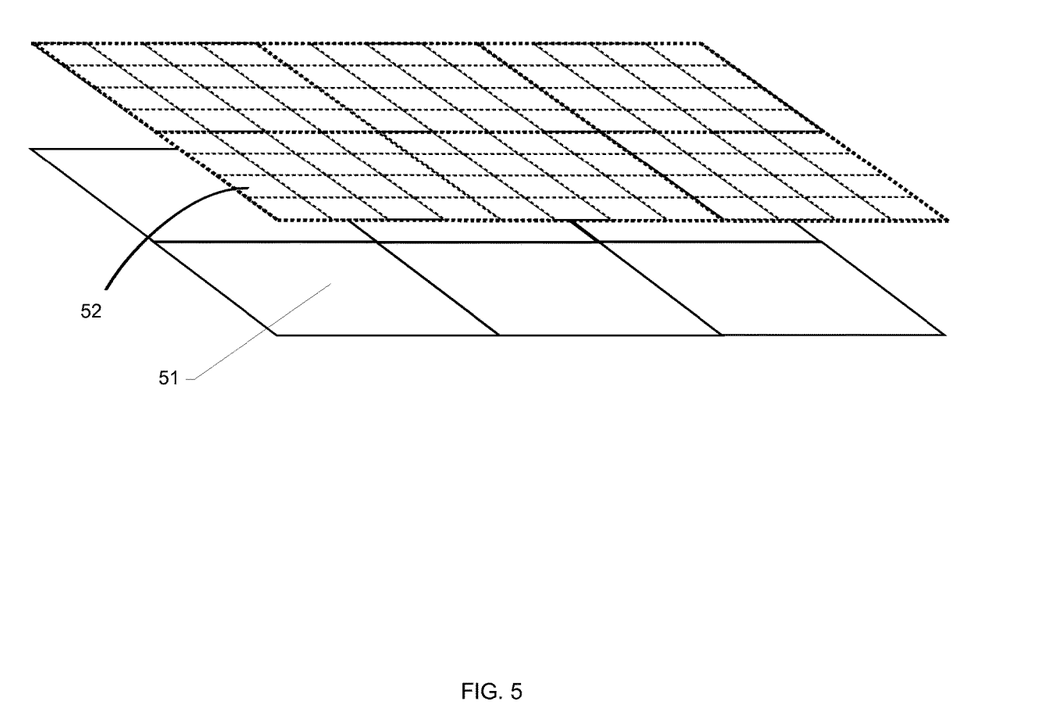
FIG. 5 depicts a grid that may be laid over elevation data, separating that data into cells, with each cell being identifiable using a coordinate system, and cells being further divisible into sub-cells, also identified with a coordinate system.

For ease of explanation, the following discussion focuses on the application of the invention to an elevation dataset acquired by an aerial full waveform LIDAR altimetry sensor. The approach, however, is easily applied to range measurements in general, whether they are terrestrial or aerial in nature. FIG. 5 depicts a measurement grid where each cell 51 corresponds to single full waveform LIDAR measurement. Each cell 51 is divided into multiple sub-cells 52, where each sub-cell 52 is sized to approximately match the resolution of the images (FIG. 4, 42).

Referring to FIG. 5, the notation $A=(A_x, A_y)$ denotes a cell 51 in the input elevation grid and A is the set of all cells in the region under consideration. In order to combine the LIDAR and imagery data, an enhancement factor $r>=1$ is selected which corresponds to the resolution improvement of the images over the LIDAR measurement size. For example, if the extent of a single LIDAR measurement is one meter, and the images have an approximate pixel size of twenty centimeters, then $r=5$ would be an appropriate choice. Each cell in the input dataset is then subdivided into $r^2$ sub-cells. A sub-cell is labeled $B=(B_s, B_t)$, with B denoting the set of all such sub-cells. Note that for each sub-cell B, there is a single parent cell in A, which can be computed easily as $Parent(B)=(\lfloor B_s/r \rfloor, \lfloor B_t/r \rfloor)$. Thus, the aim of the method is to accurately assign an elevation measurement, denoted by $E_B$, to each sub-cell $B \in B$.

An elevation range $[E_{MIN}, E_{MAX}]$ is determined which corresponds to the elevation range of the LIDAR dataset over the grid 51. Additionally, an elevation step size $E_{STEP}$ is specified, which partitions the interval $[E_{MIN}, E_{MAX}]$ into $$M = \left\lfloor \frac{E_{MAX} - E_{MIN}}{E_{STEP}} \right\rfloor$$

possible values $\varepsilon = \{\varepsilon_1, \ldots, \varepsilon_M\}$. The measurement $E_B$ assigned to a sub-cell B corresponds to one of the values in $\varepsilon$. Let L denote an assignment of elevation values to all sub-cells in B. The goal of the method is to find an accurate assignment of elevation values from the set of all possible choices $\mathcal{L}$. The quality of a particular assignment will be measured by a function F(L) consisting of three terms, $$F(L) = F_d + k_s F_s + k_h F_h \quad (1)$$

where $F_d$ represents the imagery data, $F_s$ represents the local surface consistency, and $F_h$ represents the agreement of the elevations with the LIDAR measurement distributions. $k_s$ and $k_h$ are weighting coefficients which control the relative importance of the three sources of information to the algorithm. By minimizing F over all assignments $L \in \mathcal{L}$, the method identifies an optimal elevation estimate for each sub-cell of the grid, given as $$\hat{L} = \underset{L \in \mathcal{L}}{\mathrm{argmin}}\, F(L).$$

F(L).

Several stereo extraction methods in the prior art make use of a global optimization based on an imagery term and a smoothness term (U.S. Pat. No. 6,046,763 to Roy). There is, however, no consideration in the prior art of a method to simultaneously consider stereo with additional distance measurement information such as that available from full waveform LIDAR. Although a plethora of stereo extraction methods exist which can extract range information purely from imagery, the accuracy of such approaches is significantly inferior to that available from active range sensors such as LIDAR or IFSAR.

Figure 3:
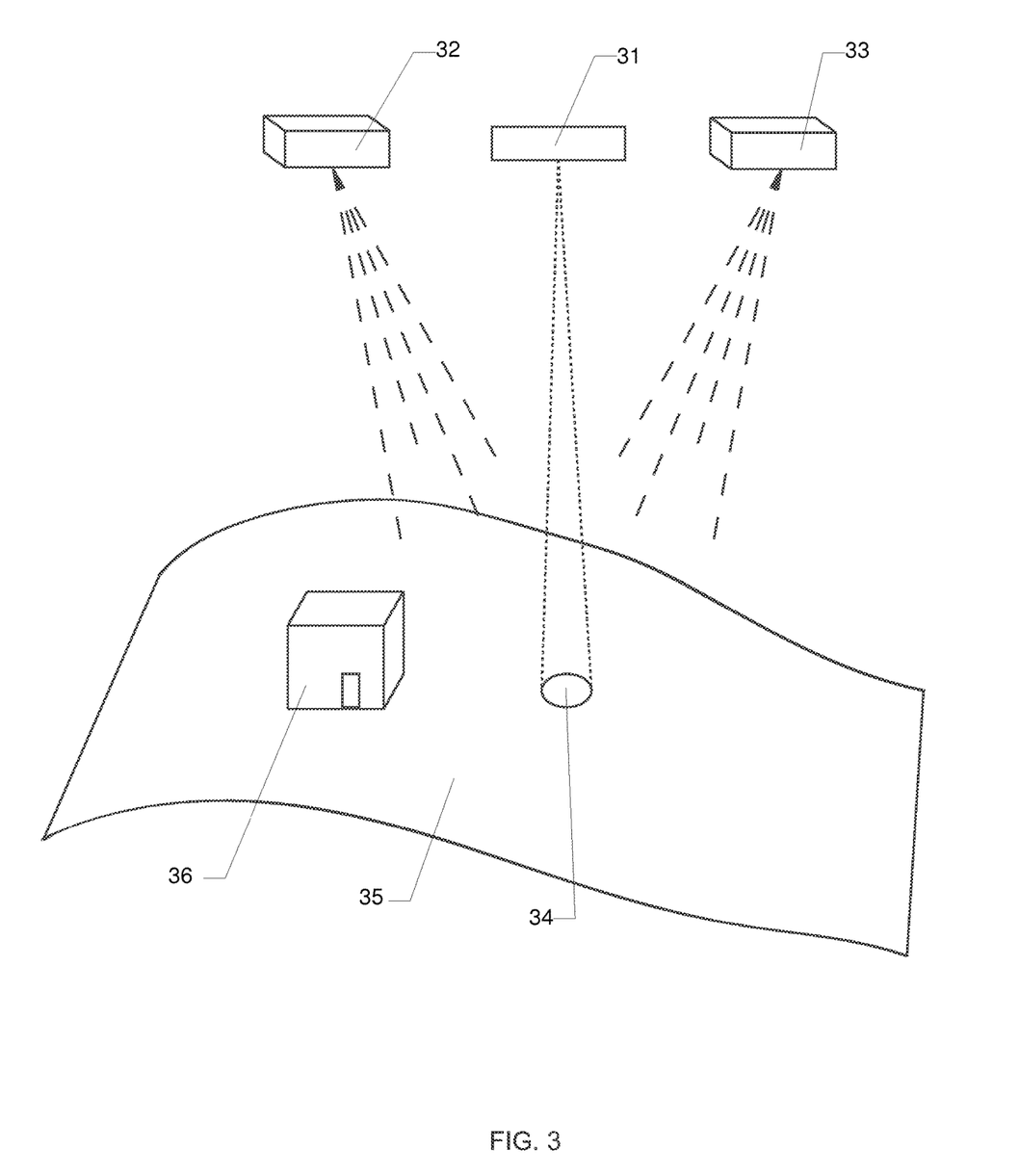
FIG. 3 shows a LIDAR sensor, two cameras, and a LIDAR measurement region on the ground with a nearby building.

FIG. 3 depicts two cameras 32, 33 which have acquired images of the same surface 35. Each of the cameras $i=1 \ldots N$ has a corresponding image $I_i$. A region of the surface measured by LIDAR must be present in at least two views in order to produce hybrid range measurements for that region. The notation $I_i(u_i, v_i)$ denotes the image intensity at pixel location $(u_i, v_i)$ in image i. In the case of single-channel (grayscale) imagery, $I_i(u_i, v_i)$ is a scalar value, while in the case of color or multi-band imagery, $I_i(u_i, v_i)$ is a vector.

A standard pinhole camera model is used to represent the image locations and orientations in the common coordinate system. The image projection matrices are given by the augmented 3×4 matrix, $$W_i = [R_i \mid T_i]$$

where $R_i$ is a 3×3 rotation matrix and $T_i$ is a 3×1 translation vector. $R_i$ and $T_i$ correspond to the orientation and position, respectively, of image i in the common coordinate system. A point $P=[x\ y\ z\ 1]^T$ in homogeneous coordinates can therefore be transformed to pixel coordinates $(u_i, v_i)$ in image $I_i$ by the relation, $$\begin{bmatrix} u_i \\ v_i \\ 1 \end{bmatrix} = W_i P$$

The shorthand notation $Proj_i(x, y, z) = I_i(W_i P)$ represents the pixel value corresponding to the projection of the coordinate location (x, y, z) onto image i.

Returning to the definition of F(L), the global cost function in equation (1), the additional terms can now be defined as follows:

$$F_d = \sum_{B \in B} \left[ \binom{|U_B|}{2}^{-1} \sum_{i,j \in U_B} c(Proj_i(B_x, B_y, E_B), Proj_j(B_x, B_y, E_B)) \right] \quad (2)$$

where the set $U_B$ represents the image pairs in which $(B_x, B_y, E_B)$ is viewable, that is
$U_B = \{\{i,j\}: Proj_i(B_x, B_y, E_B) \in I_i$ and $Proj_j(B_x, B_y, E_B) \in I_j\}$ and $c(p_1, p_2) = \|p_1 - p_2\|$ is a cost function for comparing image pixel values.

$$F_s = \sum_{B \in B} \left[ \sum_{J \in N(B)} s(E_B, E_J) \right] \quad (3)$$

where N(B) represents the four neighboring cells of B, and $s(z_1, z_2)$ is a smoothness function, given by $s(z_1, z_2) = |z_1 - z_2|$. Lastly, $$F_h = \sum_{A \in A} h(H_A, Z_A) \quad (4)$$

where $Z_A$ is an m-binned histogram of the sub-cells $B \in B$ with Parent(B)=A, and $H_A$ is the normalized histogram from the full waveform LIDAR measurement of cell A. The function $h(H_A, Z_A)$ is a histogram comparison function, given as $h(H_A, Z_A) = \sum_{i=1}^{m} (H_{Ai} - Z_{Ai})^2$ with $H_{Ai}$ denoting the value of the $i^{th}$ bin of the LIDAR measurement data for cell A and $Z_{Ai}$ defined similarly. In the case of range measurements which do not contain a histogram of each measured region, such as those from non-full waveform LIDAR, it is still possible to compute hybrid measurements. In this case, the measurement distribution for each region is estimated using a normal distribution. Depending on the range sensor and surface characteristics, a standard deviation $\sigma$ for the range measurements is determined and $H_A$ is defined as $H_A \sim N(R_A, \sigma)$ for a given range measurement $R_A$ corresponding to the range measurement of cell A.

It is finally necessary to identify the set of optimal elevation assignments L. To accomplish this, a Markov Random Field (MRF) is constructed from the definition of F which corresponds to the labeling problem of the nodes of 13. MRF's are commonly used in the prior art (Sun et al., 2002, Felzenszwalb and Huttenlocher, *Efficient Belief Propagation for Early Vision*, International Journal of Computer Vision, Vol. 70, No. 1 (October 2006)) to solve labeling problems in computer vision algorithms, but there is no consideration in the prior art of a method incorporating multiple sources of range measurement information into the labeling.

The nodes of the MRF correspond to the sub-cells $B \in B$, while the set of potential labels to be assigned to each node is $\varepsilon = \{\varepsilon_1, \ldots, \varepsilon_M\}$. Let $M_{BK}^t$ be the M-dimensional message passed from node B to node K at time t. $M_{BK_i}^t$ then denotes the $i^{th}$ element of the message, while $E_B^{(t)}$ denotes the elevation estimate of sub-cell B at time t.

A sum-based (log-likelihood) belief propagation method is used to solve the MRF iteratively. At time t=0, all messages are initialized to 0, and all $E_B^{(0)}$ are initialized to their parent cell elevation measurements (i.e. the mode of the measured histogram). Based on the definition of F in equations (1)-(4), the inter-node messages are computed for future time steps as follows:

$$M_{BK_i}^t = \frac{1}{|U_B|} \sum_{i,j \in U_B} c(Proj_i(B_x, B_y, \varepsilon_i), Proj_j(B_x, B_y, \varepsilon_i)) + \quad (5)$$

-continued
$$k_s \sum_{J \in N(B) \setminus K} s(\varepsilon_i, E_B^{(t-1)}) + k_h h\left(H_{Parent(B)}, \overline{Z}_B^{(t-1)} + i\right)$$

where $$\overline{Z}_B^{(t-1)} = hist_{X \in B: X \neq B, Parent(B) = Parent(X)}(E_Z^{(t-1)})$$

Thus, $\overline{Z}_B^{(t-1)}$ is the computed normalized histogram of elevation estimates of the sibling sub-cells of B at the previous time step, not including B itself. The expression $\overline{Z}_B^{(t-1)} + i$ indicates that the histogram is updated to include $E_B = \varepsilon_i$ for purposes of the message computation. Thus, for each of the regions $A \in (A)$, h is comparing the distance histogram predicted by the full waveform LIDAR measurement to the MRF's current best estimate at each message computation. Over time, h drives the distribution of values in each cell toward the LIDAR-measured distribution subject to the weighting coefficients. This serves to maintain the high accuracy of the LIDAR measurements in the resulting hybrid computations.

It should be noted that while it is useful in improving the quality of the results, the smoothing term $F_s$ is optional in this context. Accurate results may be obtained using only the data teem $F_d$ and the histogram term $F_h$ and making appropriate changes to the message-passing term $M_{BK_i}^t$.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

I claim:

1. A global optimization method for increasing the spatial resolution of a range measurement, the method comprising:
    gathering, by an electromagnetic proximity sensor, at least one range measurement that corresponds to a measurement region of a target, wherein the range measurement includes a full waveform;
    gathering, by at least one camera, at least two images of the measurement region, wherein each image of the measurement region includes a plurality of image data including a location and an orientation;
    gathering the location and the orientation for each of the at least two images of the measurement region;
    defining a grid upon the measurement region, wherein the grid includes at least two sub-cells which have a higher spatial resolution than the range measurement;
    correlating the sub-cells with a plurality of pixels from the images;
    computing a plurality of new range measurements with a histogram corresponding to the full waveform; and
    assigning the new range measurements to the sub-cells to increase the spatial resolution of the range measurement.

2. The method of claim 1 that includes utilizing an equation $F(L) = F_d + k_h F_h$, wherein F(L) represents a quality of the new range measurement, $F_d$ represents the plurality of image data, $F_h$ represents an agreement of the new range measurement with said range measurement, and $k_h$ is a weighting coefficient corresponding to a contribution of information to the spatial resolution of the range measurement.

3. The method of claim 2 wherein $$F_d = \sum_{B \in \mathcal{B}} \left[ \frac{1}{|U_B|} \sum_{i,j \in U_B} c(Proj_i(B_x, B_y, E_B), Proj_j(B_x, B_y, E_B)) \right],$$

wherein B represents a sub-cell, $\mathcal{B}$ represents a set of all sub-cells, $\Sigma_{B \in \mathcal{B}}$ represents a summation over each sub-cell in the set of all sub-cells, $U_B$ represents a set of image pairs wherein each image of a pair of images includes a location corresponding to a coordinate location represented as $(B_x, B_y, E_B)$, $\Sigma_{i,j \in U_B}$ represents a summation over each image pair in the set of image pairs, $Proj_i(B_x, B_y, E_B)$ represents a projection of the coordinate location $(B_x, B_y, E_B)$ on image i of the pair of images, $Proj_j(B_x, B_y, E_B)$ represents a projection of the coordinate location $(B_x, B_y, E_B)$ on image i of the pair of images, and c represents a cost function for comparing image pixel values.

4. The method of claim 2 wherein the grid includes at least two cells, each of the at least two cells including at least two sub-cells, wherein $$F_h = \sum_{A \in \mathcal{A}} h(H_A, Z_A),$$

wherein $\Sigma_{A \in \mathcal{A}}$ represents a summation over each cell in a set of all cells, h represents a histogram comparison function, $Z_A$ represents an m-binned histogram of the sub-cells $B \in \mathcal{B}$, $H_A$ represents a histogram normalized to a range measurement of cell A.

5. The method of claim 2 further comprising constructing a Markov Random Field.

6. The method of claim 1 further comprising utilizing an equation $F(L) = F_d + k_s F_s + k_h F_h$, wherein F(L) represents a quality of the new range measurement, $F_d$ represents the plurality of image data, $F_s$ represents a surface consistency, $F_h$ represents an agreement of the new range measurement with said range measurement, $k_s$ represents a weighting coefficient corresponding to a contribution of $F_s$ to F(L), and $k_h$, represents a second weighting coefficient corresponding to a contribution of $F_h$ to F(L).

7. The method of claim 6 wherein $$F_d = \sum_{B \in \mathcal{B}} \left[ \frac{1}{|U_B|} \sum_{i,j \in U_B} c(Proj_i(B_x, B_y, E_B), Proj_j(B_x, B_y, E_B)) \right],$$

wherein B represents a sub-cell, $\mathcal{B}$ represents a set of all sub-cells, $\Sigma_{B \in \mathcal{B}}$ represents a summation over each sub-cell in the set of all sub-cells, $U_B$ represents a set of image pairs wherein each image of a pair of images includes a location corresponding to a coordinate location represented as $(B_x, B_y, E_B)$, $E_{i,j \in U_B}$ represents a summation over each image pair in the set of image pairs, $Proj_i(B_x, B_y, E_B)$ represents a projection of the coordinate location $(B_x, B_y, E_B)$ on image i of the pair of images, $Proj_j(B_x, B_y, E_B)$ represents a projection of the coordinate location $(B_x, B_y, E_B)$ on image j of the pair of images, and c represents a cost function for comparing image pixel values.

8. The method of claim 6 wherein $$F_s = \sum_{B \in \mathcal{B}} \left[ \sum_{J \in N(B)} s(E_B, E_J) \right],$$

wherein B represents a sub-cell, $\mathcal{B}$ represents a set of all sub-cells, $\Sigma_{B \in \mathcal{B}}$ represents a summation over each sub-cell in the set of all sub-cells, $\Sigma_{j \in N(B)}$ represents a summation over four sub-cells neighboring sub-cell B, $E_B$ represents an elevation value at a coordinate location $(E_x, E_y)$, $E_J$ represents an elevation value of one of the four sub-cells neighboring sub-cell B, and s represents a smoothness function with inputs $E_B$ and $E_J$.

9. The method of claim 6 wherein the grid includes at least two cells, each of the at least two cells including at least two sub-cells, wherein $$F_h = \sum_{A \in \mathcal{A}} h(H_A, Z_A),$$

wherein $\Sigma_{A \in \mathcal{A}}$ represents a summation over each cell in a set of all cells, h represents a histogram comparison function, $Z_A$ represents an m-binned histogram of the sub-cells $B \in \mathcal{B}$, $H_A$ represents a histogram normalized to a range measurement of cell A.

10. The method of claim 6 further comprising constructing a Markov Random Field.

11. A global optimization system for increasing the spatial resolution of a range measurement, the system comprising:
an electromagnetic proximity sensor that gathers at least one range measurement that corresponds to a measurement region of a target, wherein the range measurement includes a full waveform;
a camera that gathers at least two images of the measurement region, wherein each image of the measurement region includes a plurality of image data including a location and an orientation;
a hybrid range measurement system that gathers the location and the orientation for each of the at least two images of the measurement region;
the hybrid range measurement system defines a grid upon the measurement region, wherein the grid includes at least two sub-cells which have a higher spatial resolution than the range measurement;
the hybrid range measurement system correlates the sub-cells with a plurality of pixels from the at least two images;
the hybrid range measurement system computes a plurality of new range measurements with at least one histogram corresponding to the full waveform; and
the hybrid range measurement system assigns the new range measurements to the sub-cells to increase the spatial resolution of the range measurement.

12. The system of claim 11 comprising an equation $F(L) = F_d + k_h F_h$, wherein F(L) represents a quality of the new range measurement, $F_d$ represents the plurality of image data, $F_h$ represents an of the new range measurement with the range measurement, and $k_h$, is a weighting coefficient corresponding to a contribution of information to the spatial resolution of the range measurement.

13. The system of claim 12 wherein $$F_d = \sum_{B \in \mathcal{B}} \left[ \frac{1}{|U_B|} \sum_{i,j \in U_B} c(Proj_i(B_x, B_y, E_B), Proj_j(B_x, B_y, E_B)) \right],$$

wherein B represents a sub-cell, $\mathcal{B}$ represents a set of all sub-cells, $\Sigma_{B \in \mathcal{B}}$ represents a summation over each sub-cell in the set of all sub-cells, $U_B$ represents a set of image pairs wherein each image of a pair of images includes a location corresponding to a coordinate location represented as $(B_x, B_y, E_B)$, $\Sigma_{i,j \in U_B}$ represents a summation over each image pair in the set of image pairs, $Proj_i(B_x, B_y, E_B)$ represents a projection of the coordinate location $(B_x, B_y, E_B)$ on image i of the pair of images, $Proj_j(B_x, B_y, E_B)$ represents a projection of the coordinate location $(B_x, B_y, E_B)$ on image i of the pair of images, and c represents a cost function for comparing image pixel values.

14. The system of claim 12 wherein the grid includes at least two cells, each of the at least two cells including at least two sub-cells, wherein $$F_h = \sum_{A \in \mathcal{A}} h(H_A, Z_A),$$

wherein $\Sigma_{A \in \mathcal{A}}$ represents a summation over each cell in a set of all cells, h represents a histogram comparison function, $Z_A$ represents an m-binned histogram of the sub-cells $B \in B$, $H_A$ represents a histogram normalized to a range measurement of cell A.

15. The system of claim 12 further comprising a Markov Random Field.

16. The system of claim 11 further comprising an equation $F(L) = F_d + k_s F_s + k_h F_h$, wherein F(L) represents a quality of the new range measurement, $F_d$ represents the plurality of image data, $F_s$ represents a surface consistency, $F_h$ represents an agreement of the new range measurement with said range measurement, $k_s$ represents a weighting coefficient corresponding to a contribution of $F_s$ to F(L), and $k_h$ represents a second weighting coefficient corresponding to a contribution of $F_h$ to F(L).

17. The system of claim 16 wherein $$F_d = \sum_{B \in \mathcal{B}} \left[ \frac{1}{|U_B|} \sum_{i,j \in U_B} c(Proj_i(B_x, B_y, E_B), Proj_j(B_x, B_y, E_B)) \right],$$

wherein B represents a sub-cell, $\mathcal{B}$ represents a set of all sub-cells, $\Sigma_{B \in \mathcal{B}}$ represents a summation over each sub-cell in the set of all sub-cells, $U_B$ represents a set of image pairs wherein each image of a pair of images includes a location corresponding to a coordinate location represented as $(B_x, B_y, E_B)$, $\Sigma_{i,j \in U_B}$ represents a summation over each image pair in the set of image pairs, $Proj_i(B_x, B_y, E_B)$ represents a projection of the coordinate location $(B_x, B_y, E_B)$ on image i of the pair of images, $Proj_j(B_x, B_y, E_B)$ represents a projection of the coordinate location $(B_x, B_y, E_B)$ on image j of the pair of images, and c represents a cost function for comparing image pixel values.

18. The system of claim 16 wherein $$F_s = \sum_{B \in \mathcal{B}} \left[ \sum_{J \in N(B)} s(E_B, E_J) \right],$$

wherein B represents a sub-cell, $\mathcal{B}$ represents a set of all sub-cells, $\Sigma_{B \in \mathcal{B}}$ represents a summation over each sub-cell in the set of all sub-cells, $\Sigma_{j \in N(B)}$ represents a summation over four sub-cells neighboring sub-cell B, $E_B$ represents an elevation value at a coordinate location $(E_x, E_y)$, $E_J$ represents an elevation value of one of the four sub-cells neighboring sub-cell B, and s represents a smoothness function with inputs $E_B$ and $E_J$.

19. The system of claim 16 wherein the grid includes at least two cells, each of the at least two cells including at least two sub-cells, wherein $$F_h = \sum_{A \in \mathcal{A}} h(H_A, Z_A),$$

wherein $\Sigma_{A \in \mathcal{A}}$ represents a summation over each cell in a set of all cells, h represents a histogram comparison function, $Z_A$ represents an m-binned histogram of the sub-cells $B \in B$, $H_A$ represents a histogram normalized to a range measurement of cell A.

20. The system of claim 16 further comprising a Markov Random Field.

\* \* \* \* \*